United States Patent [19]

Smith

[11] Patent Number: 5,246,206

[45] Date of Patent: Sep. 21, 1993

[54] TEMPORARY SUPPORT STRAP FOR INSTALLING OVERHEAD TELEPHONE CABLES ON UTILITY POLES

[76] Inventor: Alan H. Smith, 111 Robert La., West Chester, Pa. 19382

[21] Appl. No.: 963,830

[22] Filed: Oct. 20, 1992

[51] Int. Cl.⁵ ............................................ E21C 29/16
[52] U.S. Cl. ............................................ 254/134.3 R
[58] Field of Search .......... 224/904, 252, 253, 269, 224/268, 224; 24/318; 254/134.3 R, 134.3 PA, 134.3 CL

[56] References Cited

U.S. PATENT DOCUMENTS

| | | | |
|---|---|---|---|
| 317,534 | 5/1885 | Moell | 224/224 |
| 373,976 | 11/1887 | Morris | 24/318 |
| 374,853 | 12/1887 | Smith | 24/318 |
| 536,390 | 3/1895 | Parker | 24/318 |
| 577,080 | 2/1897 | Solt | 24/318 |
| 1,127,832 | 2/1915 | Voigt | 24/318 |
| 1,797,098 | 3/1931 | Minehart | 224/269 |
| 1,816,413 | 7/1931 | Way . | |
| 1,905,761 | 4/1933 | St. John et al. . | |
| 2,007,820 | 7/1935 | Tucker . | |
| 2,059,825 | 11/1936 | Talbott . | |
| 2,127,034 | 8/1938 | Kabat | 224/404 |
| 2,130,164 | 9/1938 | Jacobsen . | |
| 2,332,112 | 10/1943 | Pritchard . | |
| 4,019,715 | 4/1977 | Vugrek . | |
| 4,475,715 | 10/1984 | Asplin, Sr. . | |
| 5,163,591 | 11/1992 | Leiserson et al. | 224/252 |

*Primary Examiner*—Robert C. Watson
*Attorney, Agent, or Firm*—Howson & Howson

[57] ABSTRACT

Apparatus and method for installing overhead telephone cable on utility poles using a temporary support strap to bear the weight of the telephone cable when transferring cable lashing equipment around utility poles.

5 Claims, 8 Drawing Sheets

TEMPORARY SUPPORT STRAP FOR INSTALLING OVERHEAD TELEPHONE CABLES ON UTILITY POLES

BRIEF SUMMARY OF THE INVENTION

This invention relates to overhead cable installation and more particularly to an apparatus and method for temporarily hanging overhead cable from a suspension strand. The invention is useful for temporarily hanging cable during the transfer of cable lashing equipment from one side of a utility pole to the other, and whenever a temporary cable support is needed, such as during the placement and removal of lashing equipment at the start and finish of a cable installation.

There are several methods currently used to hang overhead telephone cable. Most methods consist of attaching suspension strands from one utility pole to the next. The suspension strands have sufficient tensile strength to support telephone cable and withstand severe weather conditions. The telephone cable is lashed to the suspension strand or to an existing cable and suspension strand by wrapping lashing wire around the suspension strand and cable in a continuous helix extending from one utility pole to the next. Lashing equipment generally consists of a cable lasher and cable guide. The cable lasher is loaded with a coil of lashing wire and is movably installed on the suspension strand such that it surrounds both the telephone cable and suspension strand. Once the cable lasher is installed, it can be moved along the suspension strand to perform the lashing function. The cable guide is located in front of the cable lasher and guides the cable from a cable reel, located on a truck or trailer, to the cable lasher.

The preferred method of lashing overhead cable is the moving reel method. The moving reel method is used when a cable installation vehicle carrying a reel of cable can be driven along the pole line and there are no obstructions to prevent raising the cable from the ground to the overhead suspension strand. The vehicle can be, for example, a cable trailer, or an aerial lift truck having a provision for carrying a reel of cable. With this method, the cable lashing equipment is installed on the suspension strand adjacent to a utility pole. A pulling line is attached between the lashing equipment and cable vehicle so that, as the vehicle is driven along the pole line to the next utility pole, it will pull the lashing equipment along the length of the suspension strand and lash the cable. As the vehicle is driven, the cable unreels and is lifted to the suspension strand by the cable guide. The cable guide feeds the cable to the cable lasher. Once the lashing equipment reaches the next utility pole, the lashing equipment must be manually transferred from one side of the utility pole to the other.

The transfer of lashing equipment requires a worker to be raised in the bucket of an aerial lift truck and manually disconnect the cable guide and cable lasher from the suspension strand on one side of the utility pole and place it on the suspension strand on the other side of the utility pole. During transfer of the lashing equipment under the moving reel method, the worker must bear the weight of the cable which is pulling down on the cable guide. The weight of the cable makes the job of transferring the equipment difficult. This problem is unique to the moving reel method and does not occur with other lashing methods, such as the stationary reel method.

The stationary reel method is commonly used when obstructions prevent a trailer or aerial lift truck from being driven along the pole line or prevent the cable from being raised along the pole line. With the stationary reel method, cable blocks are manually placed at short intervals along the length of several spans of suspension strand and clamped on the strand. A pull-in line is attached to an end of a cable and is used to pull the cable through the cable blocks. The cable lasher is manually pulled along the length of the suspension strand and manually transferred around utility poles. No guide is needed with the stationary reel method, the lasher can be easily transferred around the poles because the weight of the cable is on the cable blocks and not the cable lasher. However, the stationary reel method is more time consuming in comparison with the moving reel method.

Accordingly, it is an object of the invention to eliminate the transfer problem associated with the moving reel method to take advantage of the quicker installation achieved by the moving reel method. More particularly, it is an object of the invention to provide a temporary support device for use in carrying out the moving reel method to bear the weight of the cable temporarily while the lashing equipment is transferred on a suspension strand from one side of a utility pole to the other. It is also an object of this invention to allow for easy installation of the temporary support device and to free up the hands of the worker so that installation can be preformed safely by a single person located high above ground level.

The invention addresses these and other objects with a temporary support device which allows initial attachment to the suspension strand followed by a second attachment which fastens the cable to the strand. The initial attachment supports the device, leaving both hands of the worker free. The worker can then lift the cable into position and attach it to the suspension strand by the second attachment means. Because the temporary support device bears the weight of the cable, the worker can easily transfer the lashing equipment on the suspension strand on one side of the utility pole to the other. In addition, the temporary support device is movable along the suspension strand so that, after installation of the device, the worker can slide it to a desired distance away from the utility pole to allow for easy installation of the lashing equipment. After the lashing equipment is installed, the temporary support device is easily removed.

With the invention and method as described above, the weight of the cable is removed from the equipment during transfer, safety is enhanced, installation is made easier, and the transfer can be performed in less time. The invention and method eliminates the main disadvantage of the moving reel method while enhancing its advantages.

Other objects, features and advantages of the invention will become apparent from the following detailed description when read in conjunction with the accompanying drawings.

DETAILED DESCRIPTION

Figure 1:
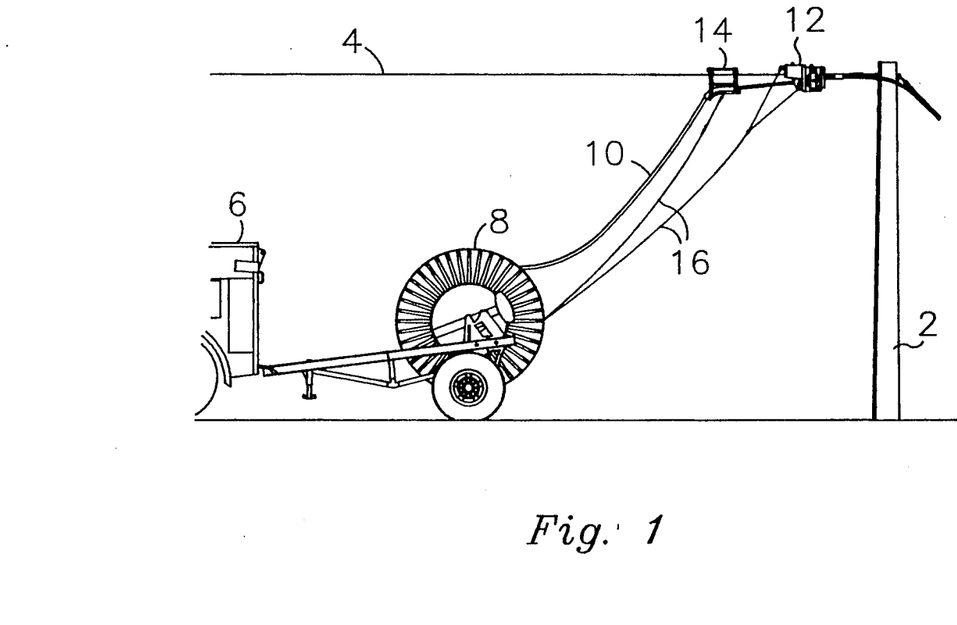
FIG. 1 is a fragmentary elevational view of an overhead suspension strand showing a cable carrying vehicle, lasher and cable guide at a starting position adjacent to a utility pole.

FIG. 1 shows a suspension strand 4 connected between a utility pole 2 and the next nearest utility pole (not shown). Strand 4 has adequate tensile strength to support telephone cable 10 after cable 10 is lashed onto it.

Using the moving reel method for installing overhead cable, vehicle 6 is driven from utility pole 2 past the next utility pole (not shown). As vehicle 6 is driven along the pole line, cable 10 is unreeled from cable reel 8 on the vehicle and lifted to the cable guide 14. Guide 14 bears the weight of cable 10 as it is lifted to strand 4 and guides cable 10 to a cable lasher 12. Both guide 14 and lasher 12 are movable along strand 4 and are attached to vehicle 6 by pull lines 16.

Figure 2:
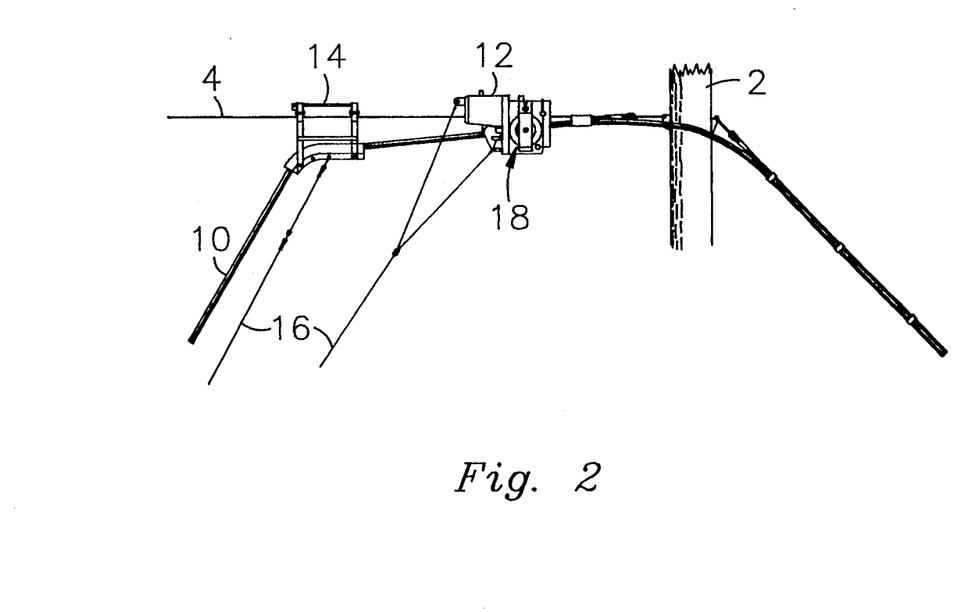
FIG. 2 is a detailed view of the cable guide and lasher at the starting position.

FIG. 2 shows lasher 12 surrounding both strand 4 and cable 10. Lasher 12 contains a reel 18 of lashing wire. As vehicle 6 is driven along the pole line pulling cable guide 14 and lasher 12, the lasher lashes cable 10 to strand 4 by winding the lashing wire around the cable and the strand.

Figure 3:
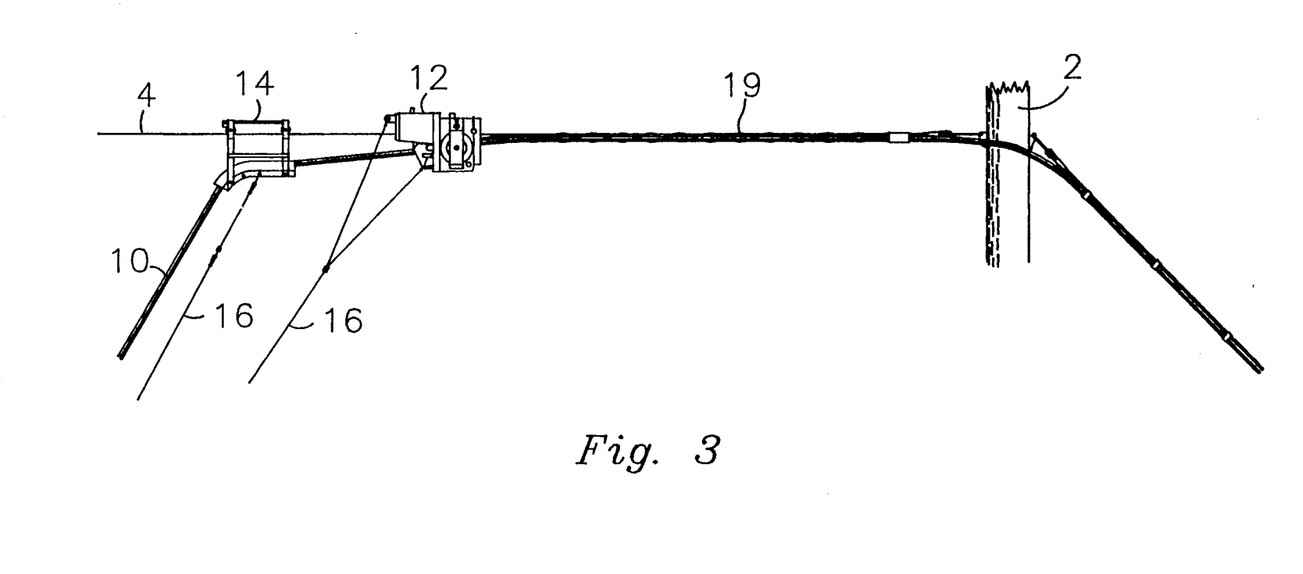
FIG. 3 is an elevational view showing the cable lashing equipment pulled a distance away from the utility
Figure 4:
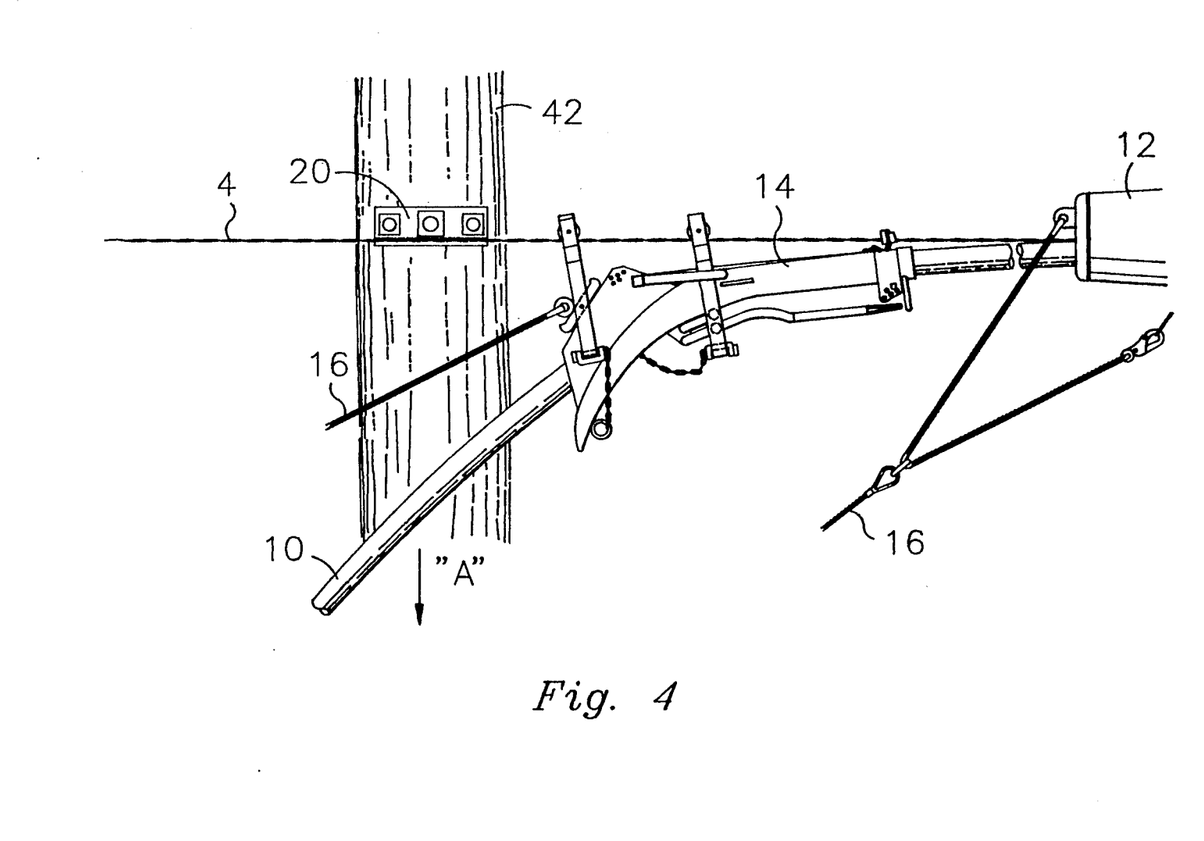
FIG. 4 is an elevational view showing the cable guide and lasher, at a location at which they must be transferred to the other side of a utility pole.

FIG. 3 illustrates a portion of cable 10 lashed to strand 4 with wire 19. Vehicle 6 continues along the pole line until guide 14 reaches the next utility pole 42, as shown in FIG. 4. When the guide reaches this position, the guide and lasher must be transferred to the span of strand 4 on the other side of utility pole 42. Clamp 20 secures strand 4 to pole 42.

According to the prior art, guide 14 is disconnected from strand 4, while bearing the vertical component "A" of the weight of cable 10, and is re-connected to strand 4 on the other side of pole 42. Vertical component "A" of the weight of the cable diminishes the safety of the person performing the transfer and makes re-connection of guide 14 difficult. Since the safety and ease of transfer are reduced, a long time is required to perform the transfer.

Figure 5:
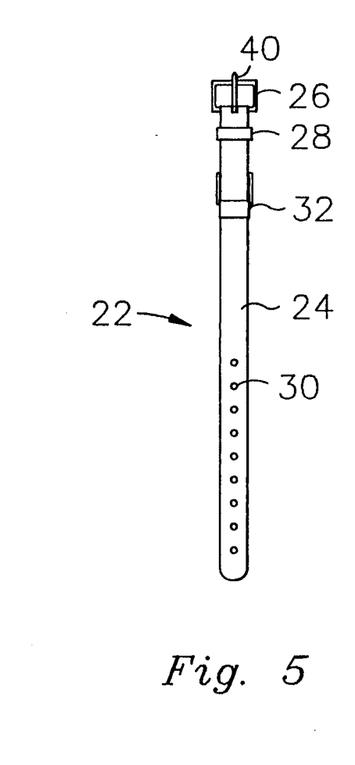
FIG. 5 is a front elevational view of an embodiment of a temporary support in accordance with the invention.

As shown in FIG. 5, temporary support 22 has a buckle 26 and a pin 40 connected at one end of a strap 24 of fabric, leather, reinforced rubber or other similar high-strength, durable material. Near the opposite end of strap 24 there is provided a series of holes 30 which can engage pin 40. To fasten the ends of the strap together, the opposite end of the strap is pushed through buckle 26 and catch 28, and one of holes 30 engages pin 40.

Figure 6:
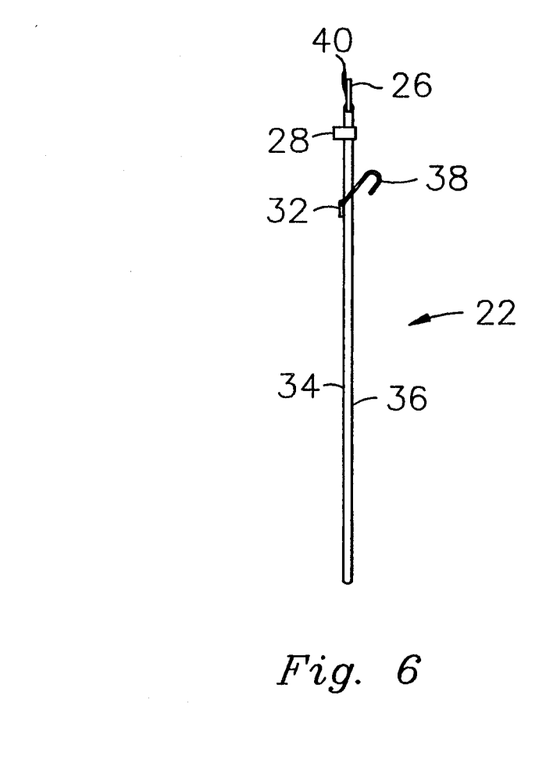
FIG. 6 is a side elevation of the support of FIG. 5.

As shown in FIG. 6, an elongated hook 38 is pivotally connected to strap 24 by connection 32, located on the strap near buckle 26. Strap 22 has a front side 34 and a back side 36. When the ends of temporary support strap 22 are fastened together such that a loop is formed surrounding both the telephone cable and the suspension strand, back side 36 is on the inside of the loop.

Figure 9:
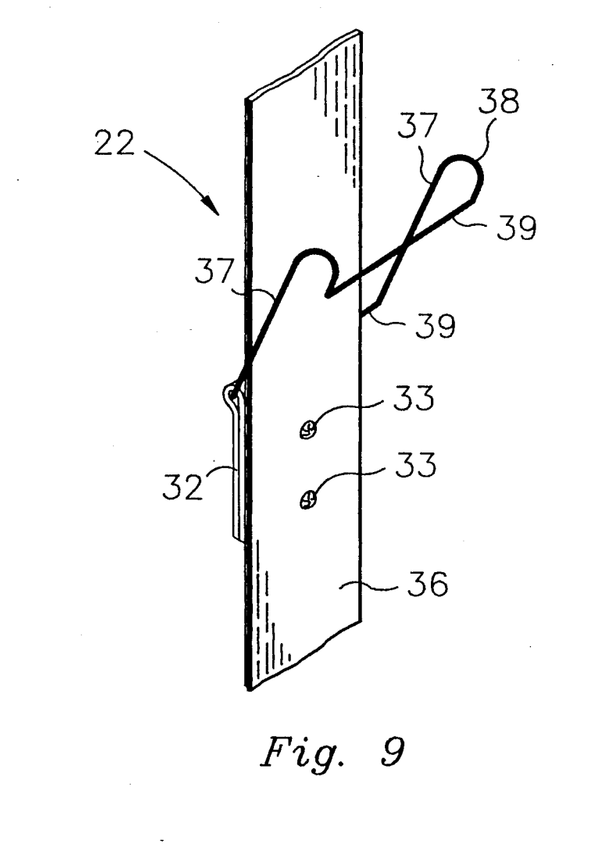
FIG. 9 is a fragmentary perspective view showing the back side of the strap of the temporary support, and illustrating the hook.
Figure 10:
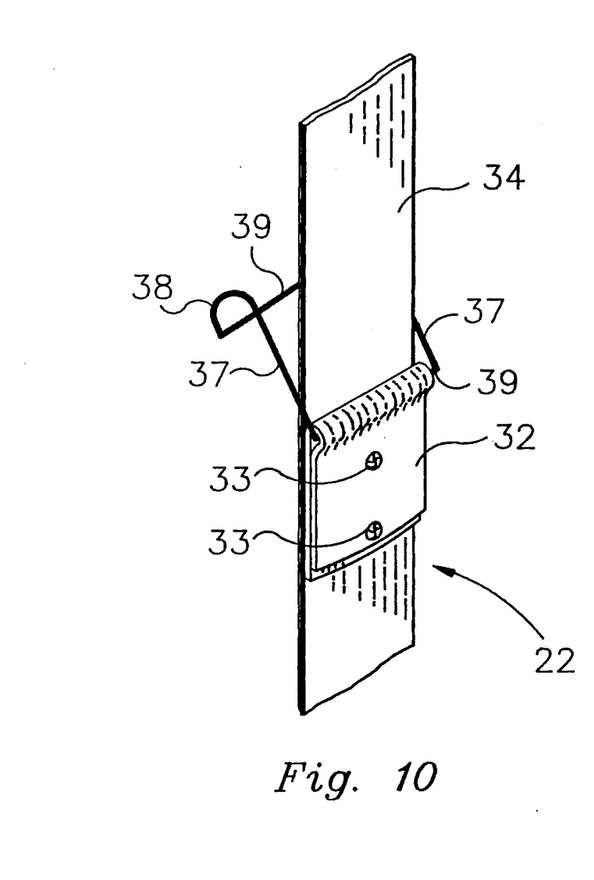
FIG. 10 is a fragmentary perspective view showing the front side of the strap and showing in detail the attachment of the hook to the strap.

Hook 38 extends from back side 36 and is oriented such that its free end extends away from the buckle 26. Because of the stiffness of the strap, after the hook is engaged with the strand, the buckle will be located above the strand, for easy access to the buckle by the worker. Also, when the ends of the temporary support are fastened together, the hook will be on the inside of the loop and will not require any additional attention by the worker. The hook is pivotally mounted to the temporary support so that it does not disengage the strand when the worker is forming the temporary support into a loop. FIGS. 9 and 10 show a hook 38 extending from back side 36 and pivotally connected to front side 34 with connection loop 32. Connection loop 32 is fastened to temporary support strap 22 by rivets 33. Hook 38 consists of two parallel J-shaped elements 37, spaced apart and connected at their ends by members 39, which are slightly longer than the width of temporary support strap 22.

Figure 7:
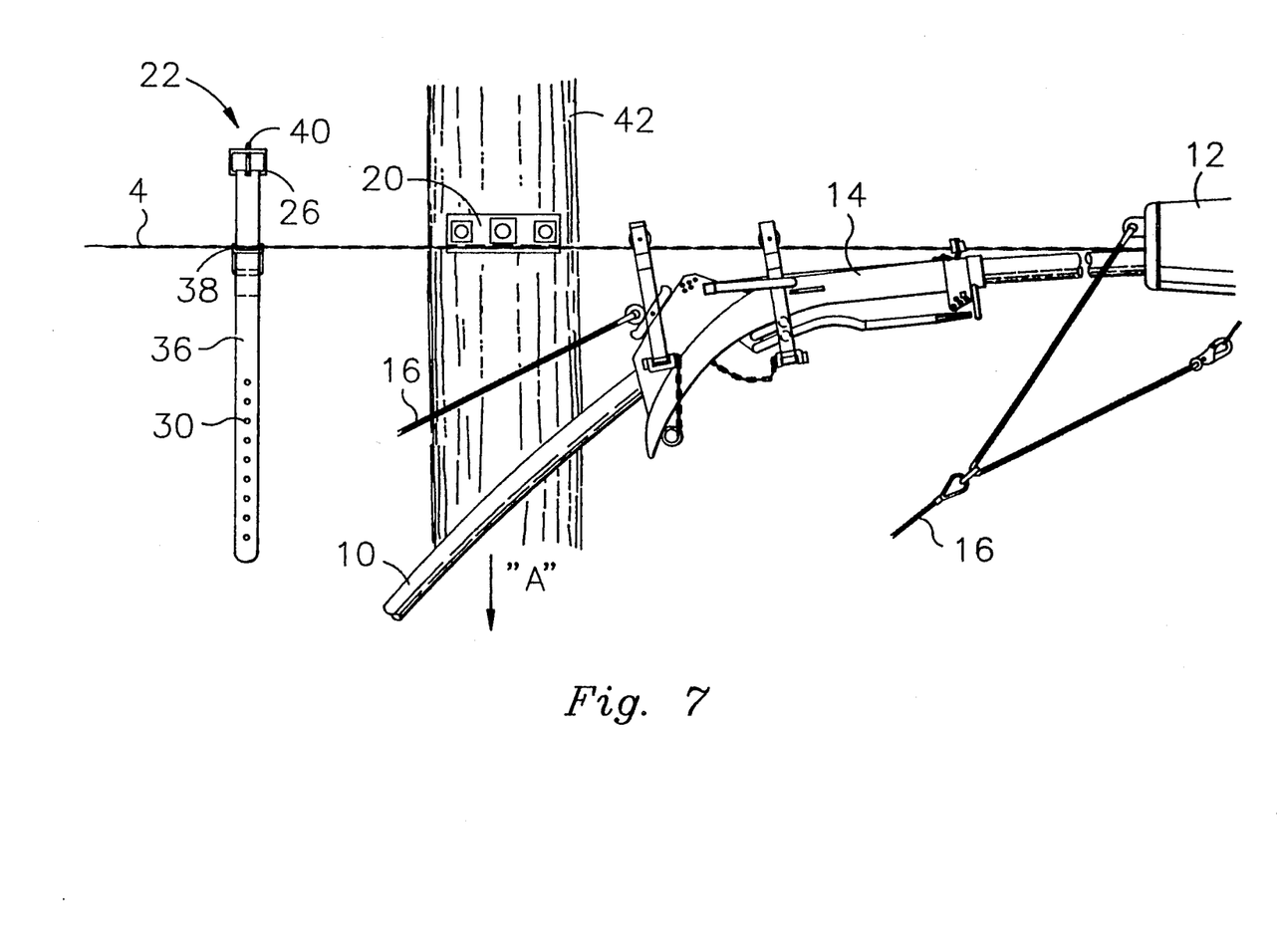
FIG. 7 is an elevational view showing the temporary support attached, in an open condition, to a suspension strand.
Figure 8:
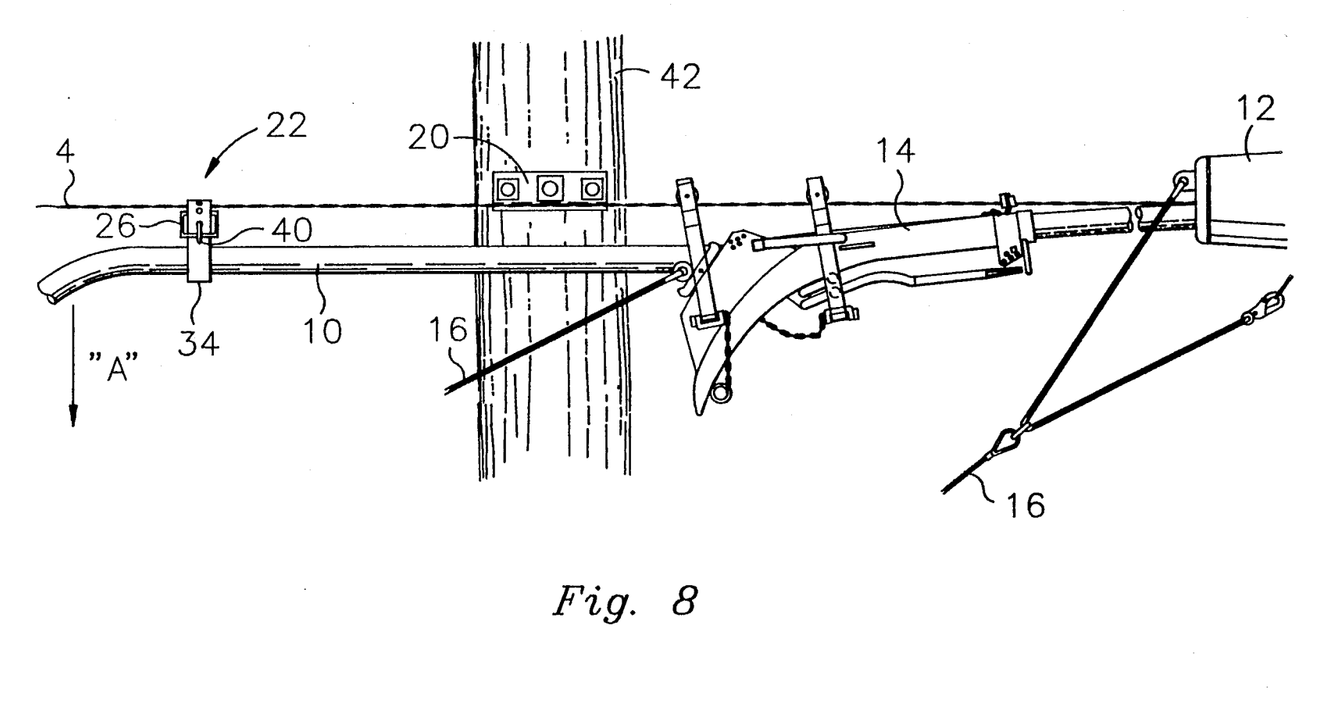
FIG. 8 is an elevational view showing the temporary support supporting a telephone cable from the suspension strand and thereby relieving the weight of the cable on the cable guide and lasher.

FIGS. 7 and 8 illustrate the method and use of temporary support strap 22 during the transfer of guide 14 and lasher 12 around utility pole 42.

FIG. 7 shows the temporary support with its hook 38 engaging strand 4. The temporary support is placed on strand 4 in such a way that its back side 36 faces the person performing the transfer. Since hook 38 independently holds temporary support strap 22 from strand 4 even though the strap is open, both hands of the worker performing the transfer are free. The worker manually raises cable 10 and pulls the lower end of temporary support 22 under cable 10. The lower end of temporary support 22 is raised to lift cable 10 to the proper height, and the ends of temporary support 22 are fastened together, as shown in FIG. 8.

FIG. 8 shows the temporary support 22 supporting cable 10 from strand 4 with the temporary support bearing vertical component "A" of the weight of cable 10. While cable 10 is held by the temporary support, guide 14 is transferred to the other side of pole 42 free from the weight of the cable. Temporary support 22 and guide 14 are pushed out farther away from pole 42 to make space for lasher 12. The hook 38 not only allows the temporary support to be held on the strand while it is in an open condition, but also facilitates sliding movement of the temporary support along the strand. Lasher 12 is then transferred, and the temporary support is removed. Trailer 6 can then be driven toward and past the next utility pole.

The invention allows transfer of the lashing equipment around a utility pole to be accomplished in a safe manner. Since the equipment can be transferred without bearing the weight of the cable, the transfer can be performed efficiently and quickly. Since the temporary support is easy to install and remove, the overall time required to transfer the guide and lasher is reduced.

Various modifications can be made to the invention described above. For example, while the strap as described utilizes a conventional buckle, other alternate fasteners can be used. Similarly, the hook 38 can be attached to the strap in various ways, and can be part of a metal element connecting two separate flexible sections of strap material. Although the method described contemplates the use of a cable trailer and a separate aerial lift truck, the cable reel can be incorporated on the lift truck so that only a single vehicle is required. These and other modifications, which will occur to persons skilled in the art, can be made without departing from the scope of the invention as defined in the following claims.

I claim:

1. A method for temporarily supporting cable during the transfer of cable lashing equipment from a first span of suspension strand, around a pole, to second span of suspension strand, which comprises:

temporarily attaching a strap, having two ends, to said second span of suspension strand by means of a hook attached to said strap at an intermediate location between the ends of said strap while said strap remains in an open condition with its ends unconnected to each other;

girding said strap in a loop around the cable and the second span of suspension strand;

securing the ends of said strap together;

releasing the cable lashing equipment from said first span of suspension strand;

attaching the cable lashing equipment to said second span of suspension strand;

unfastening the ends of said strap and removing said strap from the second span of suspension strand.

2. A method according to claim 1 in which, following the step of girding said strap around the cable and the second span of suspension strand, the strap is moved in a direction away from said pole by sliding the hook on the suspension strand.

3. A method according to claim 1 in which, in the step of temporarily attaching a strap to said second span, the strap is supported on said strand by said hook with the length of the strap situated substantially in a plane to which said suspension strand is perpendicular.

4. A method according to claim 1 in which said hook is located within the interior of said loop after the strap is girded around the cable.

5. A method according to claim 4 in which said hook is engaged with said second span of suspension strand in said temporary attachment step and remains in engagement with said span until said unfastening step.

* * * * *